United States Patent [19]
Bousquet

[11] Patent Number: 5,925,821
[45] Date of Patent: Jul. 20, 1999

[54] DEVICE FOR MEASURING NOISE IN A PIPE TRAVERSED BY A FLUID

[75] Inventor: Philippe Bousquet, Blagnac, France

[73] Assignee: Societe National Industrielle, Paris, France

[21] Appl. No.: 09/092,960

[22] Filed: Jun. 8, 1998

[30] Foreign Application Priority Data

Jun. 17, 1997 [FR] France ................................. 97 07501

[51] Int. Cl.⁶ ...................................................... G01H 3/00
[52] U.S. Cl. ............................................. 73/592; 181/0.5
[58] Field of Search ........................... 73/584, 592, 645, 73/646; 181/0.5

[56] References Cited

U.S. PATENT DOCUMENTS 5,808,243 9/1998 Mc Cormick et al. .................. 181/0.5

FOREIGN PATENT DOCUMENTS 2347307 4/1975 Germany.
2902565 8/1980 Germany.
0-192 541 7/1990 Japan.
3-76499 4/1991 Japan.
7-72873 3/1995 Japan.

OTHER PUBLICATIONS

W. Neise: "Theoretical and experimental investigations of microphone probes for sound measurements in turbulent flow" Joirnal of Sound and Vibration, vol. 39, No. 3, Apr. 8, 1975, UK, pp. 371–400.

*Primary Examiner*—John E. Chapman
*Attorney, Agent, or Firm*—Burns, Doane, Swecker & Mathis LLP

[57] ABSTRACT

For performing a noise measurement in a pipe (16) traversed by a fluid such as air, in the pipe is placed a measuring device comprising a pipe section (10) having the same cross-section and in which is formed an elongated slot (18). The slot (18) is covered with a resistive material (24) and capped by a cavity (26). The ends of the cavity form an acute angle of at the most approximately 7° relative to the axis of the pipe section (10). One or more microphones (34) are installed on the cavity (26), facing the slot (18), so that its diaphragm (36) is flush with the inner face of the cavity.

13 Claims, 2 Drawing Sheets

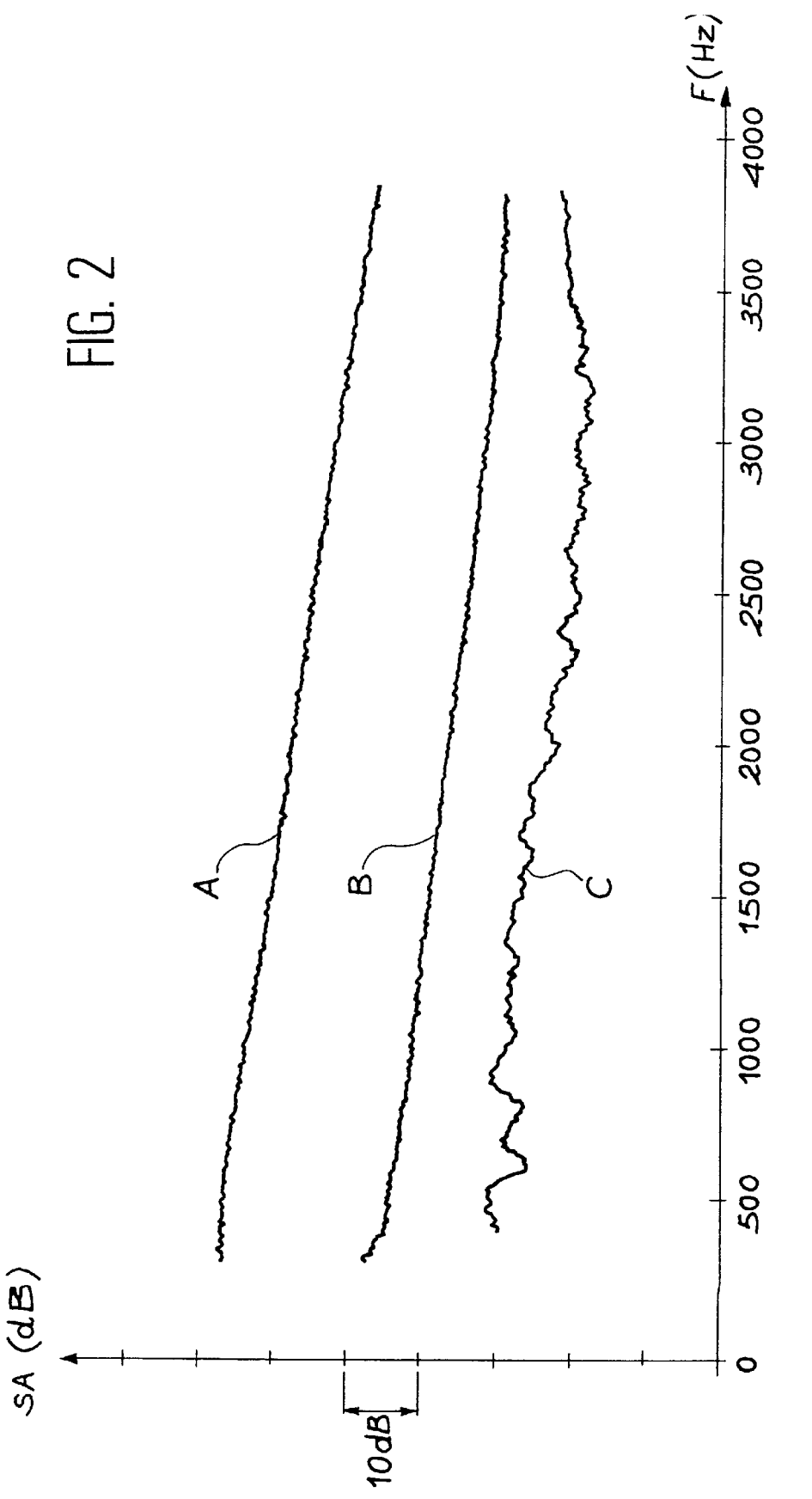

DEVICE FOR MEASURING NOISE IN A PIPE TRAVERSED BY A FLUID

DESCRIPTION

TECHNICAL FIELD

The invention relates to a device for measuring the noise propagating in a pipe in the presence of moving fluid.

Such a device can be used no matter what the nature of the moving fluid, namely either gaseous or liquid. As a non-limitative example, the fluid can be the air flowing in a pipe belonging to an air conditioning circuit equipping an aircraft.

The noise measurement device according to the invention can be used both on an existing pipe and in the laboratory. In the first case, it makes it possible to determine the noise resulting from the moving fluid in the pipe. As a function of the results of the measurements, active control systems are then placed in the pipe in order to limit the noise.

When the device is used in the laboratory, it makes it possible to determine the noise produced by a fluid passing through certain passive singularities (bend, valve, contraction, etc.) or active singularities (fan, etc.). The results obtained then make it possible to simulate the acoustic behaviour of a system of pipes and tubes having certain of these singularities by means of adapted data processing systems.

PRIOR ART

When a fluid moves within a circuit having passive and/or active irregularities, the latter produce acoustic waves, which propagate in the circuit. These acoustic waves are referred to as noise throughout the text.

The acoustic waves produced in a given circuit in this way form an acoustic field. When a reflected acoustic wave is superimposed on an incident acoustic wave, the acoustic field is said to be reactive.

The noise produced in circuits traversed by fluids constitute parasitic phenomena which must be accurately measured, so as to be able to limit the same.

Any noise measurement takes place by means of one or more microphones. A microphone measures the acoustic pressure and transforms it into an electrical signal. The use of several microphones, positioned at different locations along the path followed by the acoustic wave, makes it possible to measure the acoustic intensity of said acoustic wave. On making an analogy with an electric circuit, the acoustic pressure is the analog of a voltage and the acoustic intensity the analog of a current. Depending on whether it is wished to know one or other of these two quantities, use is made of one or more microphones.

In practice, two procedures are known for the measurement of noise in a pipe traversed by a moving fluid.

A first known procedure consists of installing one or more microphones directly in an opening formed in the pipe. More specifically, each microphone is tightly fixed to the pipe wall and outside said pipe, so that its sensitive diaphragm is flush with the inner surface of the pipe.

This procedure suffers from the significant disadvantage that the measurement of the noise takes place in the vicinity of the pipe wall, i.e. in an area where turbulent boundary layers of the moving fluid produce pressure fluctuations. These pressure fluctuations constitute interference signals, which are added to the acoustic signal which it is wished to measure and falsify the measurement.

In order to eliminate these interference signals, it is known to simultaneously install on the pipe three carefully arranged microphones and to carry out data processing of the collected signals. However, the attenuation of the interference signals remains partial and relatively limited in most cases. Thus, the contribution of the interference signals is attenuated at a maximum by 10 to 15 dB in the signal obtained after processing.

Another known procedure for measuring noise in a pipe traversed by a moving fluid consists of placing in said pipe a so-called Neise tube or Friedrich tube. The principle of this device is studied in the article by W. Neise "Theoretical and Experimental Investigations of Microphone Probes for Sound Measurements in Turbulent Flow", J. S. V., 39, pp 371–400, 1975. Such a device is marketed by Bruel & Kjaer under the reference UA 0436.

According to this procedure, in the axis of the pipe is placed a cylindrical tube having a very long longitudinal slot covered with a porous material. The upstream end of the tube (in the fluid flow direction) is extended by a nose cone-shaped end piece and its downstream end receives a microphone and a preamplifier.

Due to the fact that the device is placed in the pipe axis and only communicates therewith by a slot covered with a porous material, the interference signals due to turbulence are greatly reduced. However, this device suffers from several disadvantages.

Thus, the amplitude and phase response curve of the microphone is disturbed by sound wave reflections on the downstream part of the device. In order to attenuate these reflections, absorbant material is generally placed within the device. However, the presence of this absorbant material modifies the characteristics of said pipe.

In addition, the installation of the device in the pipe disturbs the acoustic field, as well as the fluid flow. Therefore background noise is produced by the device.

Finally, said device has a significant directivity, which renders it unusable for carrying out intensity measurements in a reactive acoustic field.

It is also known to combine the two aforementioned procedures, when it is wished to carry out an acoustic intensity measurement in a pipe. Two microphones are then directly installed on the wall of the pipe, in accordance with the first procedure. A processing of the signals obtained makes it possible to attenuate the interference signals. Moreover, a Neise tube device is placed in the flow in accordance with the second procedure. This device makes it possible to extract the coherent part of the signal obtained after processing.

The combination of the two aforementioned procedures permits a maximum reduction of the background noise limited to approximately 25 dB. Moreover, the use of the second procedure does not make it possible to perform intensity measurements in a reactive field.

DESCRIPTION OF THE INVENTION

The invention relates to a device making it possible to measure noise in a pipe traversed by a fluid by combining the advantages of the two known procedures, without suffering from their disadvantages, in particular making it possible to reduce the background noise by approximately 35 dB, no matter whether or not the acoustic field is reactive, without disturbing the flow or characteristics of the studied pipe and only very slightly modifying the acoustic field.

According to the invention, this result is obtained by means of a device for measuring noise in a pipe traversed by a fluid, characterized in that it comprises:

at least one elongated slot traversing a wall of the pipe, parallel to an axis of the latter, a resistive material sealing the slot, a cavity hermetically capping the slot, outside the pipe, having end portions forming an acute angle with the axis of the pipe, and having at least one hole remote from said ends and at least one microphone fixed to the hole facing the slot.

The slot is advantageously formed in a pipe section forming part of the device. The fact that this section has the same diameter as the remainder of the pipe and as no element is placed within the latter, the fluid flow is not disturbed. The cavity leads to a very slight damping, which only very slightly modifies the acoustic characteristics of the pipe. The presence of the slot, resistive material and cavity between the moving fluid and the microphone, makes it possible to eliminate the interference signals.

It should be noted that it is possible to simultaneously install several microphones on the cavity, so as to carry out an acoustic intensity measurement and/or a subsequent signal processing.

The resistive material is transparent to noise, but prevents the transmission in the cavity of movements of the fluid circulating in the pipe. For this purpose, the ratio of the impedances of the resistive material and the fluid is preferably below 2.

The resistive material is e.g. a sheet material, such as a perforated, polyurethane plastics film engaged against an outer face of the wall.

In a preferred embodiment of the invention, the slot is formed in the center of a level, planar portion on an outer face of the wall, the cavity being placed on said planar, level portion.

When the fluid circulating in the pipe is air, the slot has a width between approximately 1 mm and approximately 3 mm and a length of at least approximately 500 mm.

In said same application, the acute angle formed between the end portions of the cavity and the axis of the pipe is at the most approximately 7°.

Moreover, the cavity has a height of at least approximately 5 mm in the main portion located between its end portions.

The microphone is fitted in such a way that the diaphragm thereof is flush with the inner face of the cavity.

In the preferred embodiment of the invention, the cavity is in the form of a parallelepiped with cut corners in order to form the end portions.

The cut corners can in particular be obtained by placing two wedge-shaped shims in a parallelepipedic box.

In order to preserve the mechanical behaviour of the pipe section carrying the device, the elongated slot is preferably formed by elementary slots separated by bridges.

BRIEF DESCRIPTION OF THE DRAWINGS

The invention is described in greater detail hereinafter relative to non-limitative embodiments and with reference to the attached drawings, wherein show:

FIG. 2 The evolution, as a function of the frequency (in Hertz), of the acoustic signal (in dB) delivered by a microphone placed on a pipe in which air travels at 20 m/s, curve A illustrating a measurement performed by a microphone installed level and directly on the pipe, in accordance with the prior art, curve B illustrating a measurement performed by a microphone associated with a cavity, according to the invention, and curve C illustrating a measurement identical to that of curve B, followed by a known processing of the signal.

DETAILED DESCRIPTION OF A PREFERRED EMBODIMENT

Figure 1:
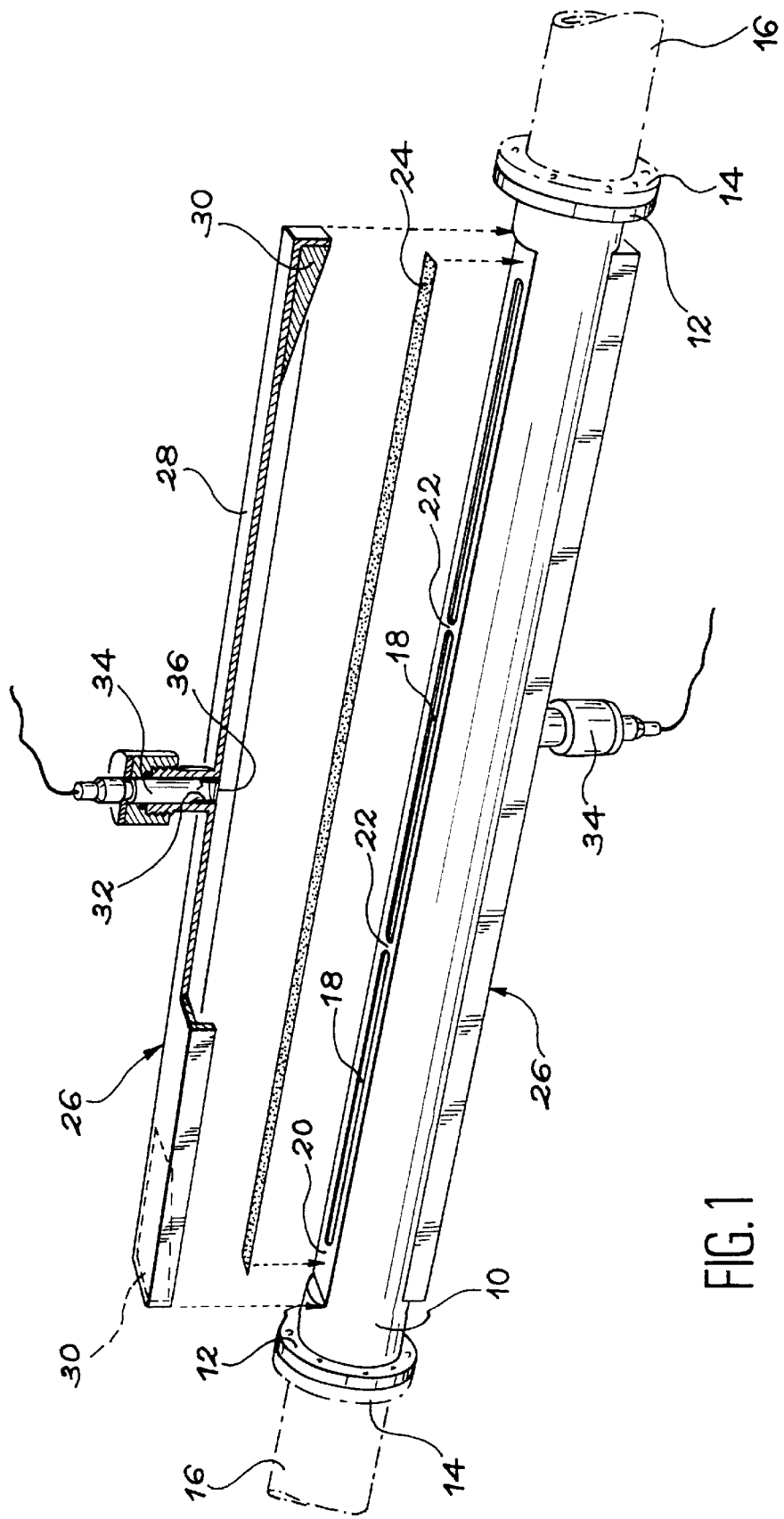
FIG. 1 An exploded, perspective view, partly in section, showing a device for measuring noise in a pipe and constructed according to the invention.

In the embodiment shown in FIG. 1, the measuring device according to the invention comprises a pipe section 10, designed for insertion in the pipe 16 in which it is wished to carry out measurements, without disturbing the fluid flow.

This pipe section 10 is in the form of a straight tube, whose internal cross-section is identical to that of the pipe 16 in which it is to be placed. The pipe section 10 is advantageously made from the same material as the pipe 16.

To permit its installation in the pipe 16, the pipe section 10 is terminated at each of its ends by a flange 12. The flanges 12 are to be tightly fixed to flanges 14 formed at the adjoining ends of the pipe 16. The tight coupling of the flanges 12 and 14 can be ensured by appropriate fixing means such as not shown bolts associated with seals.

As a variant, the noise measuring device according to the invention can be directly installed on the pipe 16 in which the fluid flows, without it being necessary to insert a separate pipe section into the circuit.

In the embodiment shown in FIG. 1, an elongated slot 18 traverses the wall of the pipe section 10, parallel to the longitudinal axis of the latter. More specifically, the slot 18 is formed in the center of a level, planar portion 20 machined on the outer surface of the wall of the pipe section 10. The slot 18 has a reduced width and extends over most of the length of the level, planar portion 20, which is itself close to the total length of the pipe section 10.

The depth of the slot 18, which is dependent on the thickness of the wall remaining after the machining of the level, planar portion 20, is as small as possible, without impairing the mechanical strength characteristics of the pipe section 10. In order to improve the rigidity of the latter, the slot 18 is preferably formed from several aligned, elementary slots, separated by bridges 22. In the embodiment shown in FIG. 1, the slot 18 is formed by three elementary slots, separated by two bridges 22 of reduced width (e.g. approximately 1 mm).

In the application of the invention to noise measurements in a pipe traversed by air, the minimum length of the slot 18 is approximately 500 mm. In the embodiment illustrated in FIG. 1, the slot 18 has a length of 1000 mm.

Moreover, the width of the slot 18 is theoretically as small as possible. However, tests carried out by the applicant have not revealed any significant difference when said width is varied between approximately 1 and approximately 2 mm. In practice, the width of the slot 18 is preferably between approximately 1 and approximately 3 mm.

As illustrated in FIG. 1, the noise measuring device according to the invention also comprises a sheet-type resistive material 24, which is engaged against the level, planar portion 20, formed on the outer face of the pipe section 10, in order to seal the slot 18. This resistive material 24 is preferably in the form of a perforated, polyurethane plastics film having an acoustic impedance of 15 to 24 Rayls cgs.

The resistive material 24 is chosen so as to be transparent to noise, whilst preventing the transmission of movements of the fluid circulating in the pipe. It is a material having a low acoustic resistance and whose impedance is close to that of the fluid flowing in the pipe. More specifically, the ratio of the impedances of the resistive material 24 and the fluid is below 2.

The resistive sheet material 24 is maintained engaged against the level, planar portion 20 by a random means (bonding, self-sealing fabric, jamming, etc.), so as to completely cover and seal the slot 18.

As illustrated in FIG. 1, the noise measuring device according to the invention also comprises a cavity 26 placed outside the pipe section 10, on the level, planar portion 20, so as to hermetically cover the slot 18 and the resistive material 24. The cavity 26 constitutes a closed volume, which communicates with the interior of the pipe section 10 by the slot 18, through the resistive material 24.

In the embodiment illustrated in FIG. 1, the cavity 26 is in the form of an elongated, rectangular parallelepiped having cut corners. It has an open face, by which it is fixed to the level, planar portion 20 by any appropriate means (welding, bonding, clamping, screwing, etc.).

More specifically, the open face of the cavity, tightly connected to the level, planar portion 20, is a rectangle, whose length slightly exceeds that of the slot 18 and whose width is between the width of the slot 18 and that of the level, planar portion 20. In the embodiment shown in exemplified manner in FIG. 1, the length of said rectangle is 1000 mm and its width is approximately 13.5 mm. The face of the cavity 26 opposite to the slot 18 is a rectangle of the same width, but of a reduced length. The lateral faces of the cavity 26, parallel to the axis of the pipe section 10, are isosceles trapezia.

Outside its open face fixed to the level, planar portion 20 of the pipe section 10, the cavity 26 is delimited by a wall. This wall is mainly formed by a paralellepipedic box 28 and by two wedge-shaped shims 30, fixed in the box 28 by any appropriate means (screwing, bonding, etc.). The box 28 is fixed to the level, planar portion by any appropriate means (welding, bonding, clamping, screwing, etc.). The constituent materials of the box 28 and shims 30 are random rigid materials, such as metals.

The shims 30 constitute a simple, non-limitative means for forming an acute angle between the end portions of the cavity 26 (in accordance with the longitudinal axis of the pipe section 10) and said longitudinal axis. More specifically, said angle is preferably given a value of at the most approximately 7° (e.g. 5.7°). This feature permits a good impedance matching of the device with the pipe and limits the influence of evanescent modes.

In its main portion located between the end portions formed by the shims 30, the cavity has a height at least equal to approximately 5 mm, so as to avoid the creation of complex, disturbing phenomena, which are difficult to model. In the described embodiment, a height of 10 mm has been adopted.

At a location remote from the end portions formed by the shims 30, the cavity 26 has at least one circular hole 32 on its face opposite to the slot 18. In the case when a single hole 32 is provided, as illustrated in FIG. 1, said hole is positioned substantially equidistant of the cavity ends. Each of the holes 32 is also positioned equidistantly of the trapezoidal, lateral faces of the cavity 26.

As illustrated in FIG. 1, a microphone 34 is tightly fixed to each of the holes 32 of the cavity 26, outside the latter, so as to face the slot 18. More specifically, said fixing is carried out in such a way that the diaphragm 36 of the microphone 34 is flush with the inner face of the cavity 26. The microphone 34 can be fixed to the cavity 26 by any appropriate means (compression spring, screwing, etc.).

It should be noted that preferably several holes 32 are provided on the same cavity 26 in order to permit the simultaneous fitting of several microphones 34. In the case where a single microphone 34 is used, the other holes 32 are sealed by not shown, tight plugs, such as screwed plugs.

When several microphones are installed on the same cavity 26, fitting takes place in such a way that each of the microphones is at least approximately 250 mm from the closest end of the cavity. Thus, the ends of the device create evanescent waves, which do not propagate and whose amplitude decreases exponentially with distance. As has already been stated, the acute angle of at the most approximately 7° formed between the end portions of the cavity 26 and the axis of the pipe section 10, limits the influence of evanescent modes.

The construction of the cavity 26 described hereinbefore with reference to FIG. 1 can be replaced by any equivalent form completely preserving the inclination of the end portions of the cavity. As a variant, a semicylindrical shape can be used.

It should also be noted that two devices identical to that described can be located on either side of the pipe section 10. These devices can then be perfectly positioned facing one another or slightly displaced in accordance with the pipe section axis, as illustrated in FIG. 1. This arrangement permits the use of several appropriately positioned microphones 34, in order to carry out a processing of the signals supplied by each of these microphones.

In order to evaluate the performance characteristics of the noise measuring device according to the invention, with the aid of the same microphone measurement took place of a zero acoustic signal on a pipe traversed by air at a velocity of 20 m/s.

More specifically and as illustrated by curve A in FIG. 2, a first measurement was carried out by directly placing the microphone flush with the pipe wall in accordance with the prior art. As is illustrated by curve B, this was followed by a similar measurement placing the same microphone in the device illustrated in FIG. 1. On each of the two curves, the frequency (in Hertz) is plotted on the abscissa and the measured acoustic signal SA (in dB) on the ordinate. The comparison of curves A and B in FIG. 2 demonstrates that the invention permits a reduction of more than 25 dB of the interference signals due to the turbulence occurring close to the pipe walls, no matter what the frequency. By adding thereto a known signal processing device, the reduction exceeds 30 dB (curve C).

In view of the fact that the device according to the invention is not directional when placed in the pipe axis, this reduction of the parasitic effects is observed both when the acoustic field is not reactive and in the presence of a reactive acoustic field.

In addition, as a result of the installation of the device entirely outside the pipe, the fluid flow within the pipe is not disturbed. Moreover, even if said cavity brings about a very slight damping, the acoustic field is only very slightly disturbed. It should also be noted that no absorbant material modifies the characteristics of the medium.

Finally, as stated, the use of several microphones associated with one or more cavities outside the pipe makes it possible to summate the advantages of the device according to the invention with those resulting from a processing of the signals supplied by the microphones.

I claim:

1. Device for measuring noise in a pipe traversed by a fluid, characterized in that it comprises:

at least one elongated slot traversing a wall of the pipe, parallel to an axis of the latter, a resistive material sealing the slot, a cavity hermetically capping the slot, outside the pipe, having end portions forming an acute angle with the axis of the pipe, and having at least one hole remote from said ends and at least one microphone fixed to the hole facing the slot.

2. Device according to claim 1, wherein the slot is formed in a pipe section having the same cross-section as the pipe.

3. Device according to claim 1, wherein the ratio of the impedances of the resistive material and the fluid is below 2.

4. Device according to claim 1, wherein the resistive material is a sheet material engaged against an outer face of the wall.

5. Device according to claim 1, wherein the slot is formed in the center of a level, planar portion formed on an outer face of the wall, the cavity being placed on said level, planar portion.

6. Device according to claim 1, wherein the slot has a width between approximately 1 mm and approximately 3 mm.

7. Device according to claim 1, wherein the slot has a length of at least approximately 500 mm.

8. Device according to claim 1, wherein the acute angle formed between the end portions of the cavity and the pipe axis is at the most approximately 7°.

9. Device according to claim 1, wherein the cavity has a height of at least approximately 5 mm between its end portions.

10. Device according to claim 1, wherein the microphone has a diaphragm flush with the inner face of the cavity.

11. Device according to claim 1, wherein the cavity is in the form of a parallelepiped with cut corners for forming the end portions.

12. Device according to claim 11, wherein the cavity comprises a parallelepipedic box, in which are placed two wedge-shaped shims forming the end portions.

13. Device according to claim 1, wherein the elongated slot is formed by elementary slots separated by bridges.

* * * * *